United States Patent

Jordan

[15] 3,664,507

[45] May 23, 1972

[54] FILTER TUBES IN A RESILIENT HOLDER

[72] Inventor: George V. Jordan, Roslyn, Pa.

[73] Assignee: Selas Corporation of America, Dresher, Pa.

[22] Filed: Apr. 15, 1970

[21] Appl. No.: 28,689

[52] U.S. Cl..............................................210/323, 210/448
[51] Int. Cl.............................................................B01d 29/20
[58] Field of Search..................210/447, 452, 323, 455, 448, 210/453, 954, 321, 490, 433; 55/16, 158

[56] References Cited

UNITED STATES PATENTS 2,042,564   6/1936   Sweetland..........................210/448 X

FOREIGN PATENTS OR APPLICATIONS 1,282,115   12/1961   France..................................210/323

Primary Examiner—Frank A. Spear, Jr.
Attorney—E. Wellford Mason

[57] ABSTRACT

The invention is a filter unit for the fine filtration of various fluids with the filter element comprising a plurality of elongated, hollow rods made of a rigid porous material that are individually held in position by a resilient holder.

7 Claims, 4 Drawing Figures

PATENTED MAY 23 1972
3,664,507
FIG. 1
FIG. 2
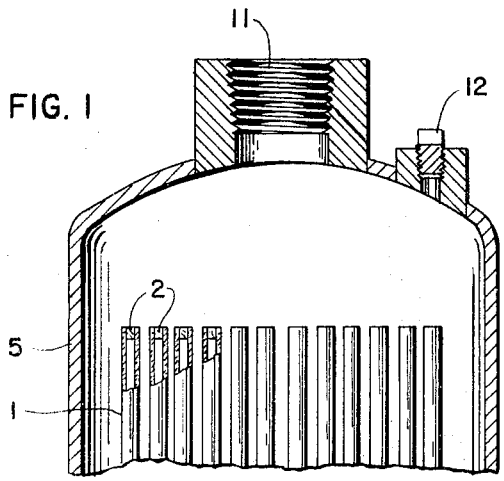
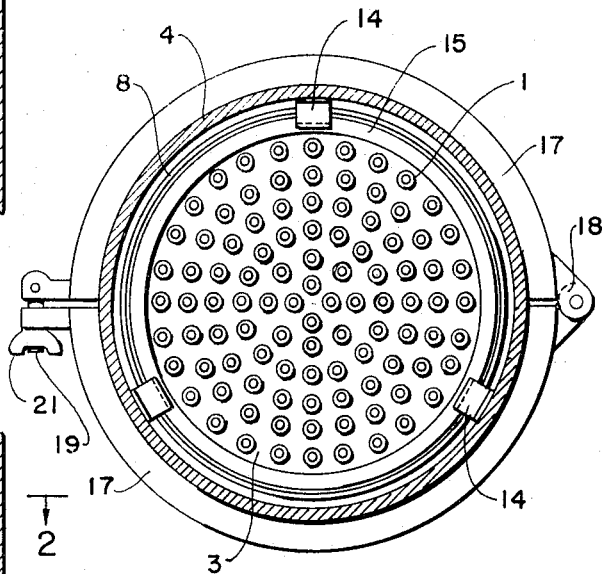
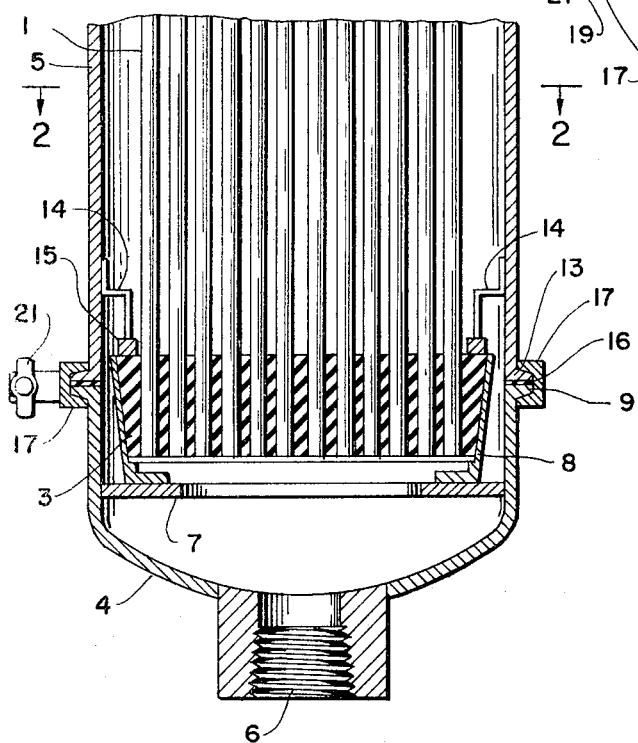
INVENTOR.
George V. Jordan
BY

PATENTED MAY 23 1972

INVENTOR.
George V. Jordan
BY

FILTER TUBES IN A RESILIENT HOLDER

SUMMARY OF THE INVENTION

The present invention relates to filters, and more particularly to the construction of a micro-porous filter unit that has a large flow capacity, and is easily disassembled and assembled for cleaning and repair.

Micro-porous porcelain has been used for many years for the fine filtration and sterilization of liquids. The filter elements are usually in the form of candles or tubes and, because of their rigidity, and the fact that they are relatively fragile, it has been difficult to combine them into multiple filter units.

It is an object of the invention to provide a rugged filter unit of large capacity for its size. It is a further object of the invention to provide a filter unit in which the filter membranes or elements comprise a multiplicity of rigid ceramic tubes.

It is a further object of the invention to provide a filter unit that can be used for fine filtration under either pressure or vacuum.

In practicing the invention, a plurality of hollow, cylindrical filter rods are used. One end of each rod is plugged and the other ends of the rods are inserted in suitable openings in a resilient holder. The holder is placed in a fixture to form a partition between the inlet and outlet for the liquid to be filtered.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a section through one form of filter.
FIG. 2 is a view taken on line 2—2 of FIG. 1.
FIG. 3 is a sectional view of another form of the invention, and
FIG. 4 is a sectional view of still another form.

DETAILED DESCRIPTION

Figure 3:
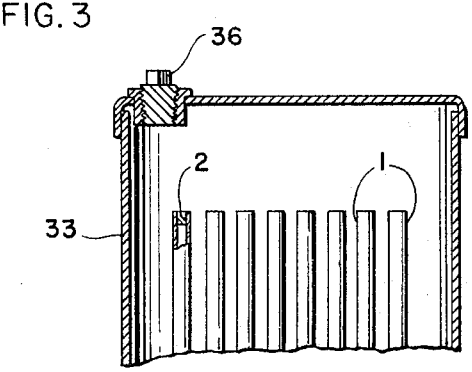

The filter unit of the present invention includes a filter element made of a plurality of filter rods 1 that are assembled in a resilient holder 3. The filter rods are formed of a porous, hollow tube or cylinder of a rigid material. The rods can be made of any substantially rigid material, but preferably made of a micro-porous ceramic and will be so described herein. The support 3 is made of an elastomeric material which is inert with respect to the fluid, usually a liquid, that is being filtered. Ordinarily, a rubber such as is used in chemical rubber stoppers will be satisfactory for this material. The holder 3 has opposed flat surfaces and is substantially cylindrical in shape, but the outer edge may be slightly tapered as shown, if desired. This holder is provided with a plurality of openings formed therein, extending perpendicularly to the faces thereof. One of the filter rods is inserted in each of the openings of the holder to make a filter element. It is noted that the upper end of each of the rods is closed as indicated at 2, whereas the lower end which is inserted in the holder is open; therefore, the fluid to be filtered passes around the outside of the rods, through the pores thereof, and is withdrawn from the bottom of holder 3.

The filter element, including the rods and the holder, is mounted in a stainless steel casing which, preferably, is cylindrical, as shown. This casing includes a lower portion 4 and an upper portion 5. The lower portion has an outlet 6 formed therein which is threaded so that it can be connected with a suitable outlet pipe or tube. The portion 4 also has rigidly fastened in it an annular disc 7 to which is attached a cup-like seat 8 to make a partition across this portion and into which holder 3 is inserted. The member 4 is also provided with a radially extending flange 9 which is slightly tapered on its lower surface. The upper half of casing 5 is provided with an inlet 11 and with a vent opening that is normally closed by a plug 12. This member also has a radially extending flange 13, the upper surface of which is slightly tapered. Casing part 5 also has in it a plurality of angularly-shaped members 14 which are used to force holder 3 into position in seat 8 with a leak proof fit. When the parts are assembled, a metal ring 15 is placed on the upper surface of the holder and the casing part 5 is moved vertically downward over and around the filter rods 1. The parts of the casing are pulled together to form a leak proof seal between them. To this end a suitable washer 16 is placed between flanges 9 and 13 and a clamp 17 is placed around the flanges to hold them together. It will be noticed that the inner edges of the clamp are tapered in a fashion corresponding to the tapering on the flanges so that as the clamp is pulled together the flanges are moved toward each other to form a seal with washer 16. By reference to FIG. 2 it will be seen that the clamp is in two parts which are hinged together at 18. One of the parts is provided with a threaded rod 19 which extends through a lip on the other part. The parts are pulled together by the action of a wing nut 21 on rod 19.

For those applications of a filter where it is desirable to have the filter inserted directly in a pipe, the construction of FIG. 3 is used. In this figure the filter element, consisting or rods 1 and holder 3, is the same as that which has been previously described. Also, the casing is of stainless steel and consists of two parts with the upper end of the upper part being provided with a vent that is normally closed by a plug 36.

As shown herein, the lower part of the casing includes a base casting 22 that is provided with an inlet 23 and a coaxial outlet 24. Communicating with outlet 24 is a chamber 25 that also communicates with an opening in a seat or socket 26 similar to that previously described in connection with FIG. 1. This seat is suitably brazed to a surface formed on the casting to make a partition between the inlet and outlet. The casting is also provided with a passage 27 that communicates around the edge of seat 26 and continues as an annular passage between this seat and cylinder 28 that is suitably brazed to the casting. The upper end of cylinder 28 is enlarged as shown at 29 with the upper surface forming a seat and the inner surface being threaded. When the holder 3 has been placed in seat 26, it is held in position in that seat by means of a ring 31 which is threaded into member 29. This ring is rotated to bring it against a second ring 30 to push the holder into seat 26. Ring 31 is provided with a plurality of openings 32 communicating with the upper portion of passage 27 so that fluid to be filtered moves through the passage 27 and openings 32 upwardly around the filter rods 1.

The upper free end of the rods are covered as in FIG. 1 by a cylinder member 33. The lower end of this member has an enlargement 34 attached thereto or formed thereon which has a radially extending face on its lower surface and an extension that is threaded into the threads of member 29. When assembling the filter unit, the filter element comprising holder 3 with its rods 1 inserted therein, is placed in seat 26 and ring 30 is moved downwardly against the upper surface of the holder. Ring 31 is then threaded into part 29 to hold these parts rigidly in position. The upper portion 33 of the casing is then moved over the rods and threaded into member 29, and is screwed down tightly against washer 35 to make the seal.

Figure 4:
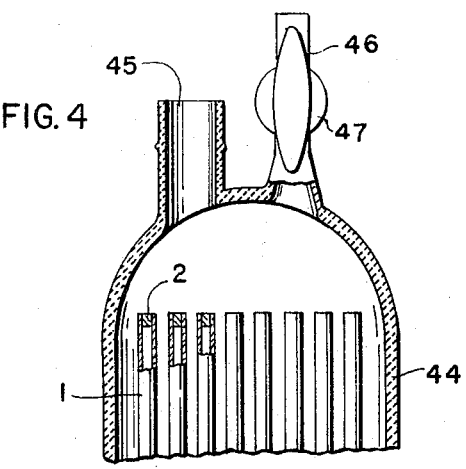
Figure 4:
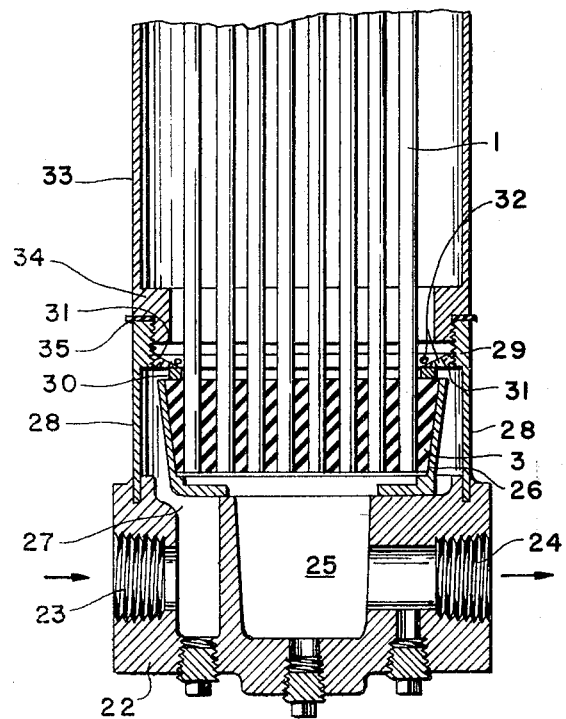
Figure 4:
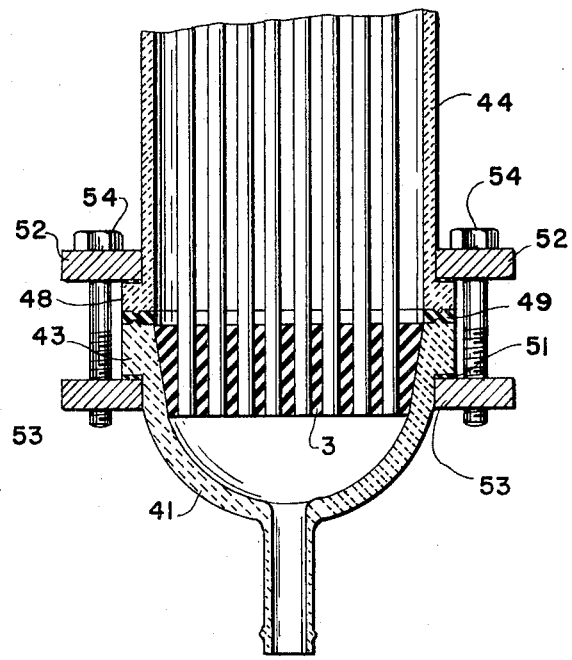

For some uses it is desirable, if not necessary, to have the casing transparent so that the operation of the filter unit can be observed. The unit of FIG. 4, now to be described, is enclosed in a glass casing.

The filter element again includes porous rods 1 which are inserted in a resilient holder 3. In this case, the lower half 41 of the casing is formed on its inner surface with a slightly conical portion similar to the seats of the previously described embodiments into which holder 3 tightly fits. Casing member 41 is also provided with a radially extending flange 43. The upper portion of the casing is a cylindrical glass tube 44 provided at its top with an inlet 45 and a vent 46 that has a conventional glass stopper 47 in it. In assembling the apparatus, the top 44 is moved down over a bundle of filter rods to bring its flange 48 against a washer 49 that has been placed on flange 43. Suitable metal rings are moved over ends of the casing parts and against washers 51, engaging the other surfaces of flanges 43 and 48. The ring 53 is pulled toward the ring 52 by means of bolts 54 that extend through threaded openings in ring 53. As the bolts are pulled tight the two halves of the casing will be moved together with a leak proof joint.

When using a filter unit of the type described, the fluid to be filtered is supplied to the inlet, usually under a substantial pressure. As the fluid is flowing into the upper part of the casing around the filter rods, air in the casing will be vented through the vent opening in the top. When the air is exhausted, the vent opening is closed and the unit is ready for operation. As mentioned above, the fluid is usually supplied under pressure. At times, however, a vacuum is applied to the discharge from the unit to draw fluid through the filter elements. Both a pressure on the supply and a vacuum on the discharge can be used if desired.

The capacity of unit will depend upon the number of filter rods in a unit, the pore size and the pressure differential across the rods. As an example, a unit constructed with 19 tubes 0.21 inches in diameter and 14.5 inches long has a total surface area of 95.7 square inches. Such rods having a maximum pore size of 0.8 microns will have a flow rate of 361 gallons per hour of a liquid having a viscosity of 1 with 15 pounds per square inch pressure differential across the rods. Such a unit can be placed in a casing 17 inches long and 1¾ inches in diameter.

In a filter of the usual type such as that shown in Walker U.S. Pat. No. 2,376,739, there is provided a single filter candle. For a filter unit having a casing diameter of 1¾ inches the filter candle can be 1 inch in diameter. This gives an area of 45.5 square inches for a candle 14.5 inches long. Therefore, for a given size unit, the present invention gives over twice the filtering area. In addition, the difficulty previously encountered in sealing the rigid ceramic parts in place without cracking them is completely overcome.

The construction described has a number of advantages. By supporting the rigid and fragile filter rods in a resilient holder at one end only, the holder can flex as it is being forced in position in the seat without placing a strain on the rods. In addition, the individual rods can vibrate without placing a strain on each other.

The filter rods can easily be replaced individually without discarding the entire assembly when for some reason one of them may clog. When a rod breaks, as is inevitable from time to time, this will immediately be detected by a pressure drop between the inlet and outlet of the unit even if it is in the center of the assembly and cannot readily be seen. Replacement is easy, and if a new rod is not available the good end of the old rod can be inserted in the holder with a barely discernable reduction in the capacity of the unit.

Micro-porous porcelain, the material preferably used for the rods, can be obtained in various controlled porosities. Depending upon the porosity of the rods used, the filter unit can be used for anything from coarse filtration to polishing and sterilization of liquids.

While in accordance with the provisions of the Statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In a filter, the combination of a holder of a non-porous, resilient material, said holder being provided with a plurality of openings therethrough, a plurality of hollow, elongated cylindrical filter rods, one end of each rod being closed and the other end open, said other ends of said rods being placed one in and snugly held in each of said openings of said holder with said one ends projecting outwardly therefrom and being unrestrained to form a filter element, a casing for said element, means forming a seat in said casing, means to force said holder into said seat whereby said holder is snugly received therein without leaks around it, said casing forming a chamber on one side of said seat which surrounds the projecting ends of said rods and being provided with an inlet for fluid to be filtered, said casing also forming an outlet for filtered fluid on the other side of said seat and in communication with the portion of said holder having openings therein opposite to the portion from which said rods project.

2. The combination of claim 1 in which said rods are rigid, ceramic micro-porous tubes.

3. The combination of claim 1 in which said rods are made of a rigid, brittle material.

4. The combination of claim 1 in which said holder is made of rubber and is substantially cylindrical in shape, said openings extending between the faces of the cylinder.

5. The combination of claim 1 in which said casing is cylindrical in shape with said inlet at one end and said outlet at the other end.

6. The combination of claim 1 in which said seat is a portion of a means forming a partition in said casing, said inlet and said outlet being coaxial and being on the opposite side of said partition from said chamber, means forming a passage between said inlet and said chamber, and means forming a passage between said partition and said outlet.

7. A filter element comprising in combination a holder of non-porous, resilient material, said holder being substantially cylindrical in shape and having opposed faces at the ends thereof, and having a plurality of openings extending between said faces, a plurality of hollow, cylindrical rods made of a rigid, porous material, one end of each of said rods being closed, with the other end being open, the open end of a rod being inserted in and snugly received in each of the openings of said holder with the closed ends being unrestrained and projecting from said holder and separated from each other and free to shift relative to each other as said holder flexes.

* * * * *